(12) United States Patent
Buelich, II et al.

(10) Patent No.: US 10,380,247 B2
(45) Date of Patent: Aug. 13, 2019

(54) LANGUAGE-BASED ACRONYM GENERATION FOR STRINGS

(71) Applicant: Microsoft Technology Licensing, LLC, Redmond, WA (US)

(72) Inventors: Nicholas Anthony Buelich, II, Bellevue, WA (US); Dmitriy Meyerzon, Bellevue, WA (US); Vidya Srinivasan, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/338,304

(22) Filed: Oct. 28, 2016

(65) Prior Publication Data

US 2018/0121411 A1 May 3, 2018

(51) Int. Cl.
*G06F 17/27* (2006.01)
*G06F 17/22* (2006.01)

(52) U.S. Cl.
CPC ........ *G06F 17/277* (2013.01); *G06F 17/2223* (2013.01); *G06F 17/275* (2013.01)

(58) Field of Classification Search
CPC combination set(s) only.
See application file for complete search history.

(56) References Cited

U.S. PATENT DOCUMENTS

| | | | |
|---|---|---|---|
| 7,236,923 B1 * | 6/2007 | Gupta | G06F 17/277 704/7 |
| 7,818,165 B2 | 10/2010 | Carlgren et al. | |
| 8,122,022 B1 | 2/2012 | Baker | |
| 8,364,470 B2 * | 1/2013 | Abraham | G06F 17/2765 704/10 |
| 8,489,387 B2 | 7/2013 | Elbaz et al. | |
| 9,195,738 B2 | 11/2015 | Parikh | |

(Continued)

FOREIGN PATENT DOCUMENTS

CN 103646017 A 3/2014

OTHER PUBLICATIONS

Tsuruoka, et al., "A machine learning approach to acronym generation", In Proceedings of the ACL-ISMB Workshop on Linking Biological Literature, Ontologies and Databases: Mining Biological Semantics, Jun. 2005, pp. 25-31.

(Continued)

*Primary Examiner* — Abul K Azad

(57) ABSTRACT

The present disclosure provides language-based mechanisms for generating acronyms from text input. The language of the text input may be provided or automatically detected. The target acronym length may indicate a maximum length and may vary depending on the input language. The text input may be separated into tokens and organized as a token tree list. Based on the tokens, an acronym may be generated from the available capital words. If there are not enough capital words, all words (e.g., both capitalized and lowercase words) may be used to generate the acronym. If there are not enough words, then all words and segments may be used to generate the acronym. Finally, a background color may be generated based characteristics relating to the text input or the generated acronym. The acronym and background color may be used to create a graphic, such as an icon or thumbnail, for a graphic user interface.

20 Claims, 14 Drawing Sheets

(56) References Cited

U.S. PATENT DOCUMENTS

| | | | |
|---|---|---|---|
| 9,798,717 B2* | 10/2017 | Motaparti | G06F 17/276 |
| 2003/0139921 A1* | 7/2003 | Byrd | G06F 17/2775 |
| | | | 704/10 |
| 2005/0075859 A1 | 4/2005 | Ramsey | |
| 2005/0267757 A1* | 12/2005 | Iso-Sipila | G10L 15/187 |
| | | | 704/260 |
| 2007/0220037 A1* | 9/2007 | Srivastava | G06F 17/30864 |
| 2012/0109974 A1* | 5/2012 | Feng | G06F 17/277 |
| | | | 707/748 |
| 2016/0217115 A1 | 7/2016 | Yutani et al. | |
| 2017/0091164 A1* | 3/2017 | Bao | G06F 17/241 |

OTHER PUBLICATIONS

Yang, et al., "Automatic Chinese Abbreviation Generation Using Conditional Random Field", In Proceedings of Human Language Technologies: Conference of the North American Chapter of the Association of Computational Linguistics, May 31, 2009, pp. 273-276.

Nigam, Nishant, "Generate abbreviations from string—The Ruby on Rails World", Published on: Apr. 16, 2012 Available at: http://www.nishantnigam.in/2012/04/generate-abbreviations-from-string.html.

Wakaki, et al., "Abbreviation generation for Japanese multi-word expressions", In Proceedings of the Workshop on Multiword Expressions: Identification, Interpretation, Disambiguation and Applications, Aug. 6, 2009, pp. 63-70.

* cited by examiner

LANGUAGE-BASED ACRONYM GENERATION FOR STRINGS

BACKGROUND

Graphical user interfaces (GUIs) provide icons (and thumbnail images) to help users quickly recognize and distinguish elements on a display. As compared to textual elements, icons are easier to recognize and are more easily and quickly distinguishable to a user. Additionally, icons may incorporate a variety of colors and cues to provide users with additional information. For example, an icon may be "greyed-out" when its functionality is unavailable or an icon may pulse or flash when it requires the user's attention. While such indicators may be applied to textual elements, textual elements usually occupy more screen area than icons (depending on the length of the text) and text may be difficult to read if it is greyed-out or flashing. By contrast, icons offer an easily-recognizable, information-dense medium to quickly convey information, indications, and additional visual cues to the user. As a result, icons and thumbnails have often been used in-lieu of or in-addition to textual elements within a GUI.

Further, a device's screen size directly impacts the size of the displayed graphical elements, and most notably impacts the size of textual elements. Due to the continuing move toward greater device mobility, users are interacting more regularly with devices that have smaller screen sizes. Cellular telephones, tablets, and even most laptops feature screens that are smaller than screens that are traditionally available with desktop computers. While the resolution and pixel density of screens has increased in recent years, improved text sharpness does not necessarily make smaller text more legible. As a result, mobile GUIs have relied even more heavily on graphical representations of information and graphical interface elements to enable quick operation and avoid user frustration.

Regardless of screen size, available screen real estate is at a premium in modern computing environments. An ever-increasing number of widgets and applications are vying for visibility on the user's screen. GUIs that present too much information may frustrate or stress the user, while applications that present too little information may be perceived as basic or underpowered. As a result, software developers and user experience designers must find novel ways to present the right amount of information without removing functionality or introducing clutter.

Some UI items (e.g., applications, sites, data, and utilities) may have default icons or thumbnails that are created by their developer. However, this is not the case for all items. Further, current methods for automatically creating an icon or thumbnail for items that do not have a default icon have been restricted to using a single character that is based on the first letter of the title (e.g. string) of the item. This leads to duplicate icons for items that begin with the same letter, which may slow down user recognition of these items.

It is with respect to these and other considerations that examples have been made. Also, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Examples of the present disclosure provide language-based mechanisms for generating acronyms from strings, such as text input, to automatically create icons/thumbnails for items displayed on user interfaces. The text input may be based on a right-to-left language or a left-to-right language. An indication as to the type of string, e.g. the language of the text input, may be provided or the language of the text input may be detected using one or more language detection techniques. Additionally, a target acronym length may be provided, which indicates that the generated acronym should be no longer than the specified value. In some instances, the target acronym length may vary depending on the language of the text input. In embodiments, the target length is two characters.

The text input may then be separated into tokens, either based on the symbolic content (e.g., white space/punctuation separated) of the input if the language is not known or the language of the input. Using the tokens, an acronym may be generated based on the available capital words, among other things. If there are not enough available capital words, all available words (e.g., both capitalized and lowercase words) may be used to generate the acronym. If there are not enough available capitalized and lowercase words, then all words and compound segments may be used to generate the acronym. Noise words (e.g., most frequently used words in a given language) may be ignored when generating the acronym. Multiple characters from existing acronyms may be prioritized. Finally, a background color may be generated to visually distinguish similar acronyms. The background color may be based on a variety of characteristics relating to the text input (e.g., a hash computed from the url or some other metadata of the item for which the acronym is generated) or the generated acronym.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Various aspects are described more fully below with reference to the accompanying drawings, which form a part hereof, and which show specific exemplary aspects. However, examples may be implemented in many different forms and should not be construed as limited to the examples set forth herein. Accordingly, examples may take the form of a hardware implementation, or an entirely software implementation, or an implementation combining software and hardware aspects. The following detailed description is, therefore, not to be taken in a limiting sense.

The present disclosure is related to an acronym generation system for use in creating graphics, such as icons and thumbnails, to represent items in user interfaces. The acronym is generated based on a string that is related to the item. In embodiments, the string may be the title of the item for which an icon is being created.

Figure 1:
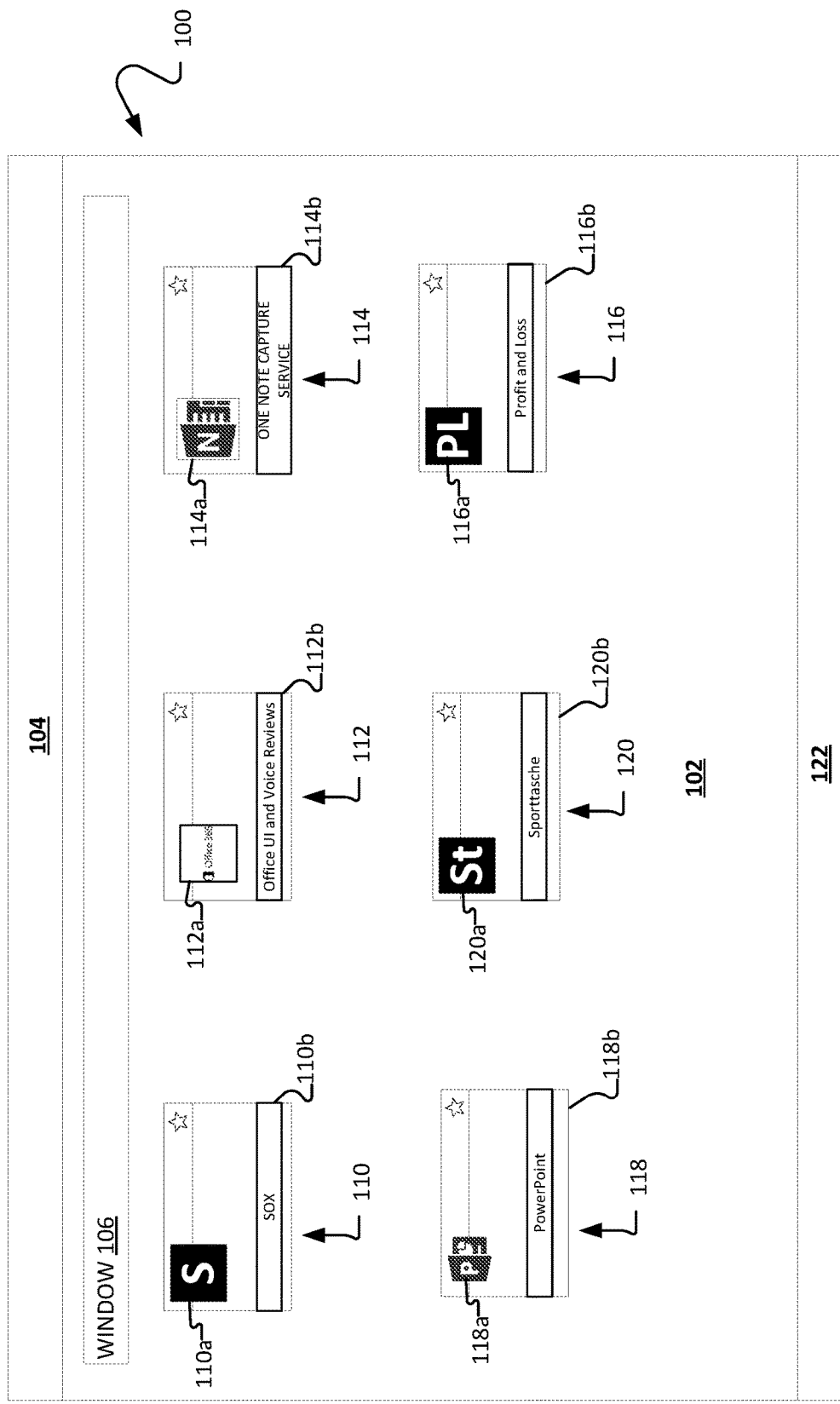
FIG. 1 depicts an exemplary user interface in accordance with an embodiment of the present invention.

FIG. 1 illustrates an exemplary user-interface 100 in accordance with embodiments of the present invention. The user interface 100 comprises a menu bar 104, a task bar 122, a window 106, and a collection display 102. Contained within collection display 102 are collection items 110-120. Menu bar 104 may include one or more dropdown menus and status indicators (not shown). In one example, menu bar 104 may be a title bar or a ribbon. Menu bar 104 may also include one or more buttons which may be used to manipulate the display properties of a search window 106. Task bar 122 comprises application shortcuts (e.g., for frequently used applications, currently running applications, favorite applications), a notification area, and/or status indicators. Window 106 may be a graphical window displayed alongside other graphical entities, or may be a full-screen application. Window 106 may contain collection display 102.

The user interface 100 may be used for operating systems, applications, shared spaces, and a variety of other utilities. For example, user interface 100 could be used as a start or home screen on computing device or mobile phone. It could also be used to display files and utilities within an application, such MICROSOFT SharePoint™ or MICROSOFT OneNote™. In other aspects, window 106 and/or collection display 102 may display a variety of content and data. In one example, window 106 may be a file browser, wherein graphical elements 110-120 are files and file folders. Collection display 102 may also be a webpage, wherein collection items 110-120 are other webpages or web resources (e.g., online communities, weblog posts, images, video links, etc.). Collection display 102 may also be a content management system such as MICROSOFT SharePoint™, wherein collection items 110-120 may be document libraries, picture libraries, lists, sites, and/or workspaces. In another example, window 106 may be a home screen, wherein collection items 110-120 represent application shortcuts or other quick-access user interface elements. One of skill in the art will appreciate that user interface 100, window 106 and collection display 102 may be used in conjunction with collection items 110-120 to display graphical content associated with other computing tasks without departing from the spirit of this disclosure. Collection items 110-120 may comprise a variety of subparts. As an example, collection item 110 may include a graphic element 110a and title element 110b. Graphic element 110a may be an icon or thumbnail image used to convey information or a description about collection item 110. Element 110b is a textual element that relates to the item 110. Graphic element 110a may be related to title element 110b.

Certain collection items may have default graphic elements associated with them that were created by their developers. For example, collection items 112, 114, and 118 are displayed using default graphic elements 112a, 114a, and 118a. By contrast, other collection items may not have default graphic elements associated with them and may instead implement aspects of the present disclosure. For example, collection items 110, 116, and 120 may lack default graphic elements and may instead include an automatically generated acronym for use in graphic elements 110a, 116a, and 120a, where the acronym is generated based on the contents of their respective title elements (e.g., 110b, 116b, and 120b).

Figure 2:
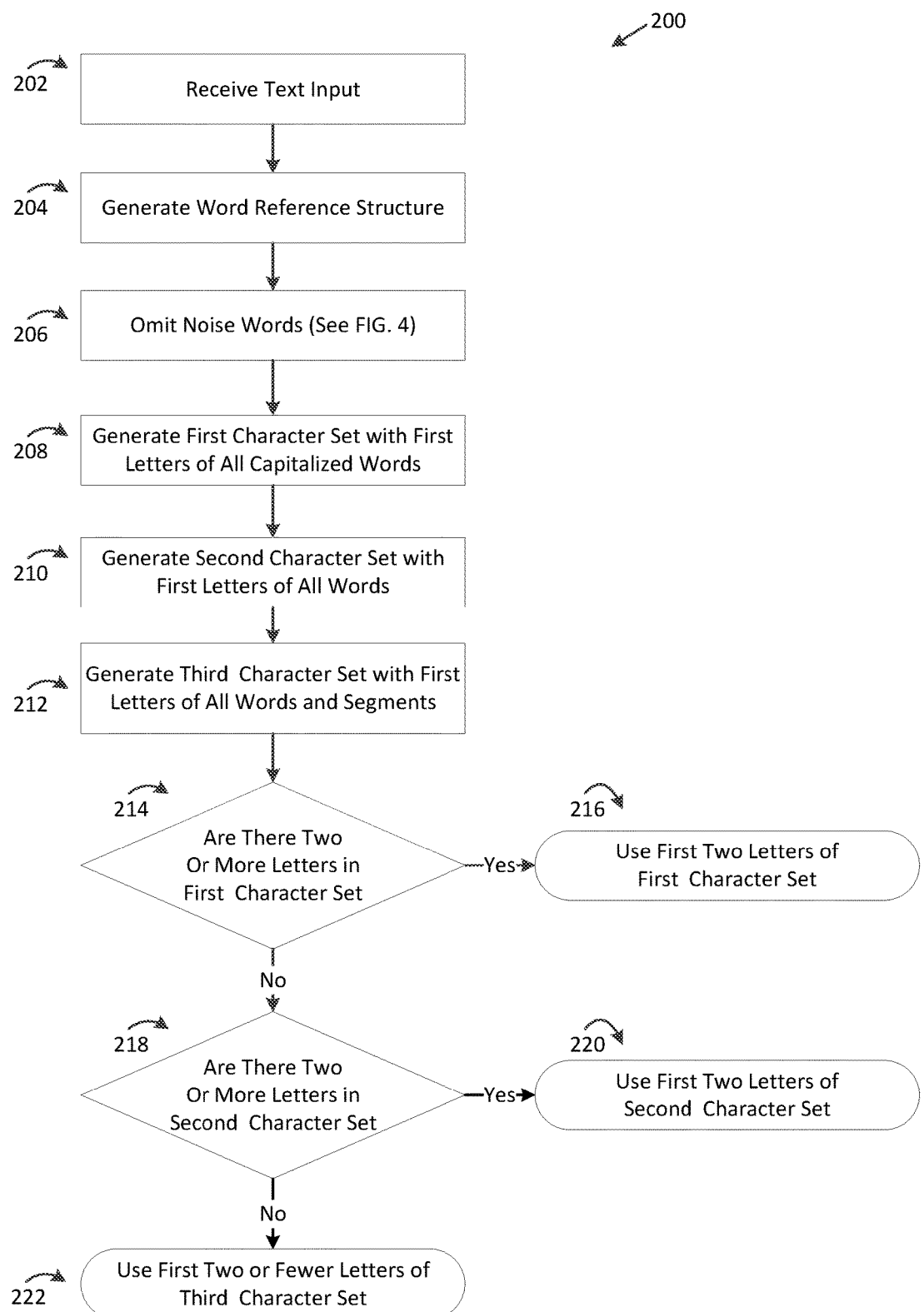
FIG. 2 illustrates an exemplary method for generating an acronym based on a string in accordance with an embodiment of the present invention.

FIG. 2 illustrates an exemplary method 200 for generating an acronym for use in a UI graphic element like those shown in FIG. 1. Method 200 may be performed by an acronym generation application, such as application 720 that described with reference to FIG. 7 below. The acronym is based on a string, such as a text input. In one example, method 200 may be performed by a device, such as computing device 700 (FIG. 7), which may be a client computing device or a server. Flow begins at operation 202, where a text input may be received from a source. The input may come from a user, as in the case of a file name, or from a developer in the case of an application. In an example, the text input may be in a language other than English, including languages that do not use whitespace or that are rich in compound words or that have a rich alphabet where combining characters randomly can generate completely different meanings. In some examples, the text input may be in a right-to-left language (e.g., Arabic, Hebrew, etc.) or in a left-to-right language (English, French, German, etc.). In one example, a target acronym length may be provided, thereby indicating that the acronym generation system should provide an acronym with a length no longer than the target acronym length. In some examples, the target acronym length may be two characters or fewer. In other examples, the acronym length may depend on the input language (e.g., for character-based alphabets such as Chinese, Japanese, or Korean, the target length may be one character, while for other languages the target length may be two characters).

In aspects, the language of the text input may be determined automatically. The automatic determination may comprise a variety of heuristics. As an example, characters comprising the text input may be evaluated and compared to known alphabetical characteristics for a variety of languages (e.g. English uses A-Z, whereas other languages have diacritics). In another example, the determination may evaluate the frequency, absence, or presence of certain words (e.g., "el" or "la" may indicate Spanish, whereas "der," "die," or "das" may indicate German), certain word endings (e.g.

"-ux," "-aux," or "-eux" may indicate French), or specific punctuation marks (e.g. the presences of a serial comma may indicate Chinese). One of skill in the art will appreciate that alternative or additional language identification techniques may be employed without departing from the scope of this disclosure.

In other aspects of the present invention, the text input may be accompanied by a language identifier. The language identifier may provide an indication as to the language content of the text input. In yet other aspects, acronym generation may occur without a language determination, and may instead be completed by assuming a default language for the text input or interpreting the text input based upon its symbolic content (e.g., whitespace and punctuation characters).

Returning to FIG. 2, flow then moves to operation 204 where a word reference structure is generated based on the text input. The word reference structure may be comprised of tokens. In one example, the tokens may be separated using a language-agnostic separation technique (e.g., whitespace characters may be used determine token boundaries). In another example, the tokens may be words, wherein the word boundaries are determined based upon an understanding of the language of the text input. For example, language understanding may permit the text input to be further separated into word segments (e.g., in languages with compound words such as German where "sporttasche" may be further tokenized into "sport" and "tasche" or languages that do not use whitespace such as Thai). The tokens may be stored in a word reference structure for later retrieval and analysis.

In embodiments of the present invention, the word reference structure may be a token tree. A token tree may utilize a tree structure in which the root node is the text input, a first child level of the tree comprises tokens within the text input, and a further child level of the tree comprises word segments (e.g., hyphenated words and compound word parts). In another embodiment, the word reference structure may comprise a variety of lists, where there is a list for capitalized words, a list for mixed-case words (e.g., capitalized words and lowercase words), and a list for compound words, hyphenated words, and word segments. In some examples, the word reference structure may contain only the first letter of each token. One of skill in the art will appreciate that the word reference structure may be generated using a variety of techniques and data structures. Alternative techniques and data structures may be used without departing from the spirit of this disclosure.

Figure 4:
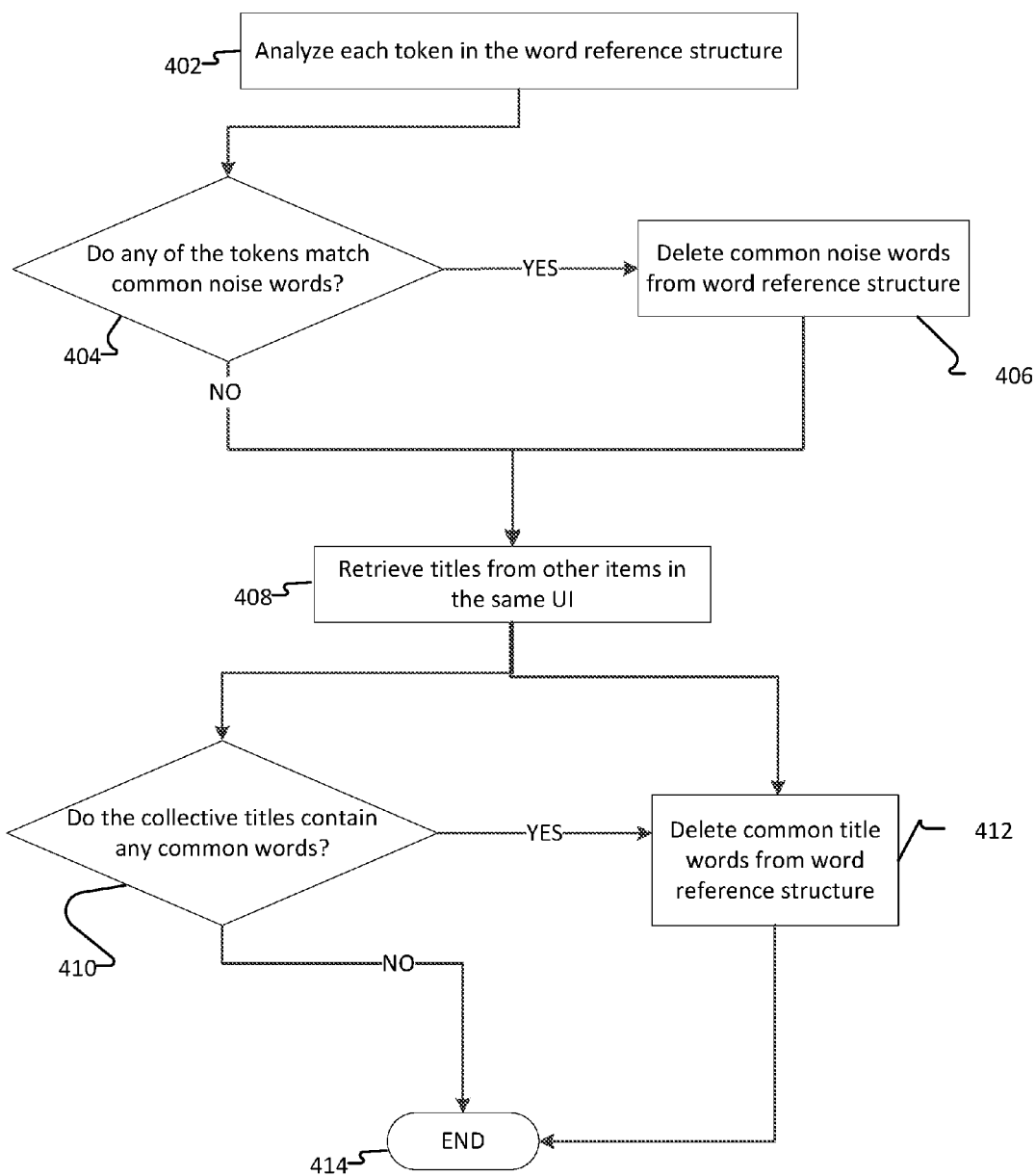
FIG. 4 illustrates an exemplary method for omitting noise words in a string in accordance with an embodiment of the present invention.

At operation 206, noise words may be omitted from the word reference structure. Noise words are generally defined as the most frequently used words in the language. In embodiment, the top 100 most frequent words are identified and then these words are removed from the word reference structure. In an example, the tokens stored in the word reference structure may be analyzed based on their content to remove noise words that should not be considered when generating the acronym. Various aspects of removing noise words from the word reference structure are illustrated in FIG. 4.

At operation 402, each token in the word reference structure is analyzed to determine its content. At decision 404, the system determines whether any of the tokens match a common noise word. In an example, common noise words may comprise words that are so common that they are not typically included in acronyms (e.g., "and," "the," and "or"). In another example, common noise words may additionally or alternatively comprise numbers or other characters that are seldom-used in acronyms. In one embodiment, words may be considered noise words regardless of whether or not they are capitalized. In another embodiment, only uncapitalized noise words are omitted from the word reference structure while capitalized noise words may be retained, or vice versa. In some examples, numbers may be determined to be noise words as well. The determination may comprise evaluating the length, quantity, and/or context associated with the number to evaluate whether the number is contextually relevant or extraneous (e.g., a year or date versus a generational identifier such as "file copy 2"). If any of the tokens match a common noise word ("YES" at step 404), those tokens are deleted from the word reference structure at operation 406 and the method proceeds to step 408. If none of the tokens are common noise words ("NO" at step 404), the method proceeds to step 408.

At step 408, the titles of other items in the same UI window (such as window 102 in FIG. 1) may be retrieved. The other items may comprise UI items of a similar type (e.g., multiple file folders or home screen icons) or of a different type (e.g., evaluating the titles of bookmarks in conjunction with application titles). Moving to decision 410, the collective word titles are evaluated to consider whether they contain any words in common. Common words may include words that are frequently used in the item descriptions or that do not generally add meaning when used within a group of similar terms. As an example, the other items might have the following titles: "MICROSOFT SHAREPOINT," "MICROSOFT OUTLOOK," "MICROSOFT OFFICE," and "Today's Outlook," it may be determined that "MICROSOFT" is a common word, while "Outlook" is not. A variety of textual analytical techniques may be used to determine what constitutes a common word.

If it is determined that there are no common words ("NO" at 410), flow ends at step 414. However, if it is determined that there are common words within the collective titles ("YES" at 410), flow branches to step 412 where common words may be removed from the word reference structure. In an alternative embodiment, decision 410 may be omitted resulting in flow progressing directly from step 408 to step 412. Flow terminates at step 414.

Returning to FIG. 2, at operation 208 a first character set or string may be generated using the letters of all capitalized tokens. Generating the first string may comprise iterating through the tokens generated and stored by operation 204 to determine which tokens contain or are associated with capitalized words.

Flow then continues to operation 210, where a second character set or string may be generated using the first letters of all words available. In some examples, the second string may be generated by iterating through the tokens stored in the word reference structure and using the first letters of all capitalized and uncapitalized words.

At operation 212, a third character set or string may be generated using the first letters of all words and segments. In an example, the third string may be generated by iterating through the word reference structure and using the first letter of tokens associated with words of either case, compound words, hyphenated words, and word segments.

Moving to decision operation 214, a determination is made whether there are two or more letters available in the first character set. In some examples, the target acronym length may be a value other than two, or may vary depending on the language of the text input. If the target length is 2 and it is determined that there are two or more letters in the first string ("YES" at 214), flow branches to operation 216, where the first two letters of the first character set may be used to generate the final acronym. Flow then terminates.

If, however, it is determined that there are not two or more letters ("NO" at 214), flow branches to decision operation 218, where a determination is made whether there are two or more letters available in the second character set. In some examples, the target acronym length may be a value other than two, or may vary depending on the language of the text input. If it is determined that there are two or more letters ("YES" at 218), flow branches to operation 220, where the first two letters of the second character set may be used to generate the final acronym. Flow then terminates.

If, however, it is determined that there are not two or more letters ("NO" at 218), flow branches to operation 222. At operation 222, the first two or fewer letters of the third character set may be used to generate the acronym. In some examples, the target acronym length may be a value other than two, or may vary depending on the language of the text input. Flow then terminates.

FIGS. 3A-3D are examples of acronyms that were generated using the method 200 described with reference to FIG. 2. The reference numbers shown on the left side of FIGS. 3A-3D correspond to the numbered operations shown in the flow diagram of FIG. 2.

Figure 3A:
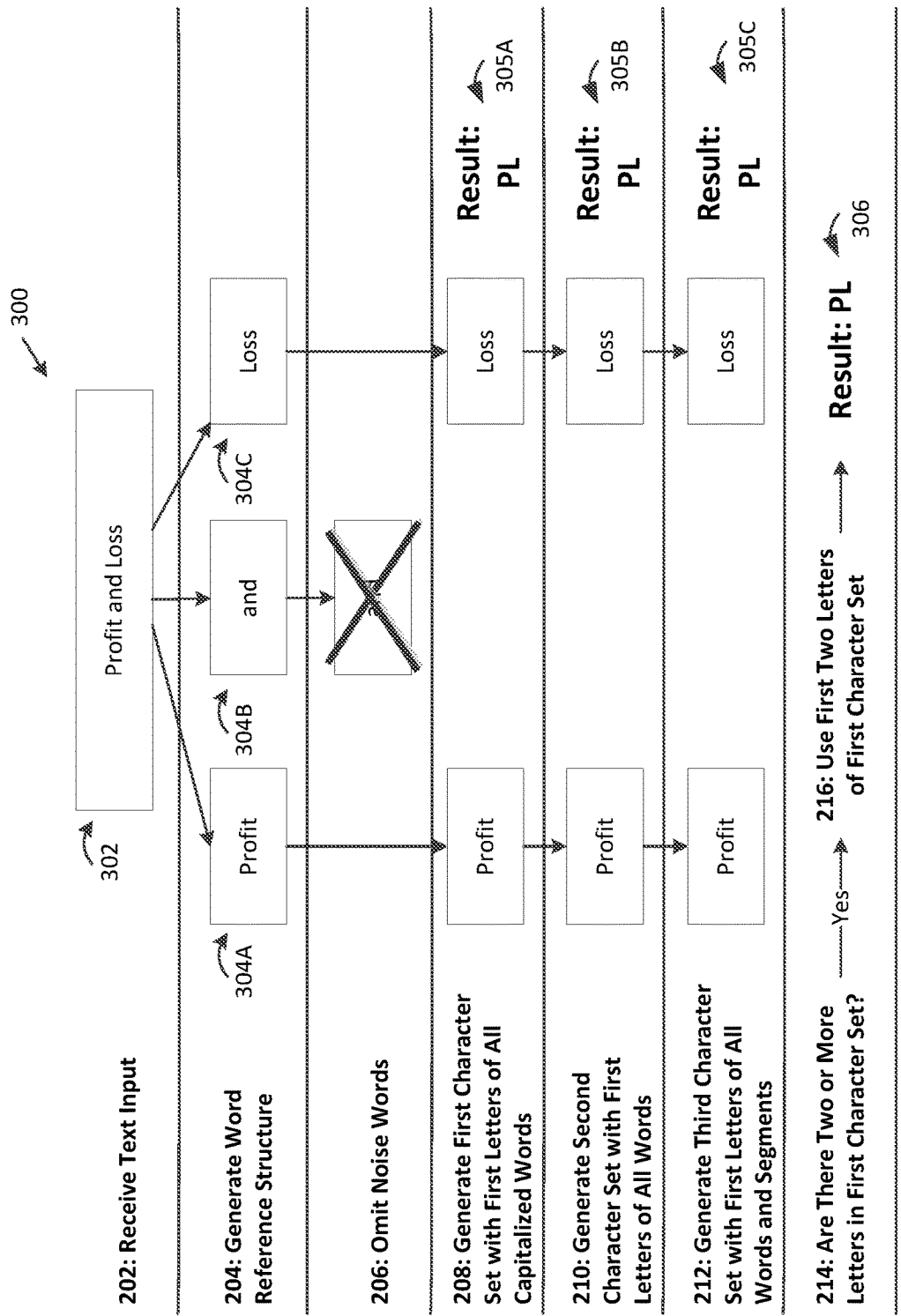
FIGS. 3A-3D depict examples of the method used to generate an acronym illustrated in FIG. 2.

FIG. 3A is an example operation where the text input string is "Profit and Loss", the target acronym length is two, and the language identifier is English. Beginning at the top, at step 202 the text string "Profit and Loss" 302 is received as text input. Next, a word reference structure is generated by operation 204, where the word reference structure comprises three tokens: (1) "Profit" token 304A, (2) "and" token 304B, and (3) "Loss" token 304C. At operation 206, the "and" token 304B is omitted from the word reference structure because it is determined to comprise a common noise word.

Operation 208 generates a first character set using the first letters of all capitalized words, which are "Profit" token 304A and "Loss" token 304C. The resulting first character set is "PL" 305A.

Operation 210 generates a second character set using the first letters of all tokens (e.g., those that are capitalized and uncapitalized). As a result of evaluating "Profit" token 304A and "Loss" token 304C, the resulting second character set is "PL" 305B.

Operation 212 then generates a third character set using the first letters of all words and segments (e.g., tokens with words of either case, compound words, hyphenated words, and word segments). As such, the third character set is generated using "Profit" token 304A and "Loss" token 304C, resulting in a character set of "PL" 305C. Decision operation 214 evaluates whether there are two or more letters in the first character set. In this example there are two letters: P and L. As such, these are used to generate the final acronym output of "PL" 306.

Figure 3B:
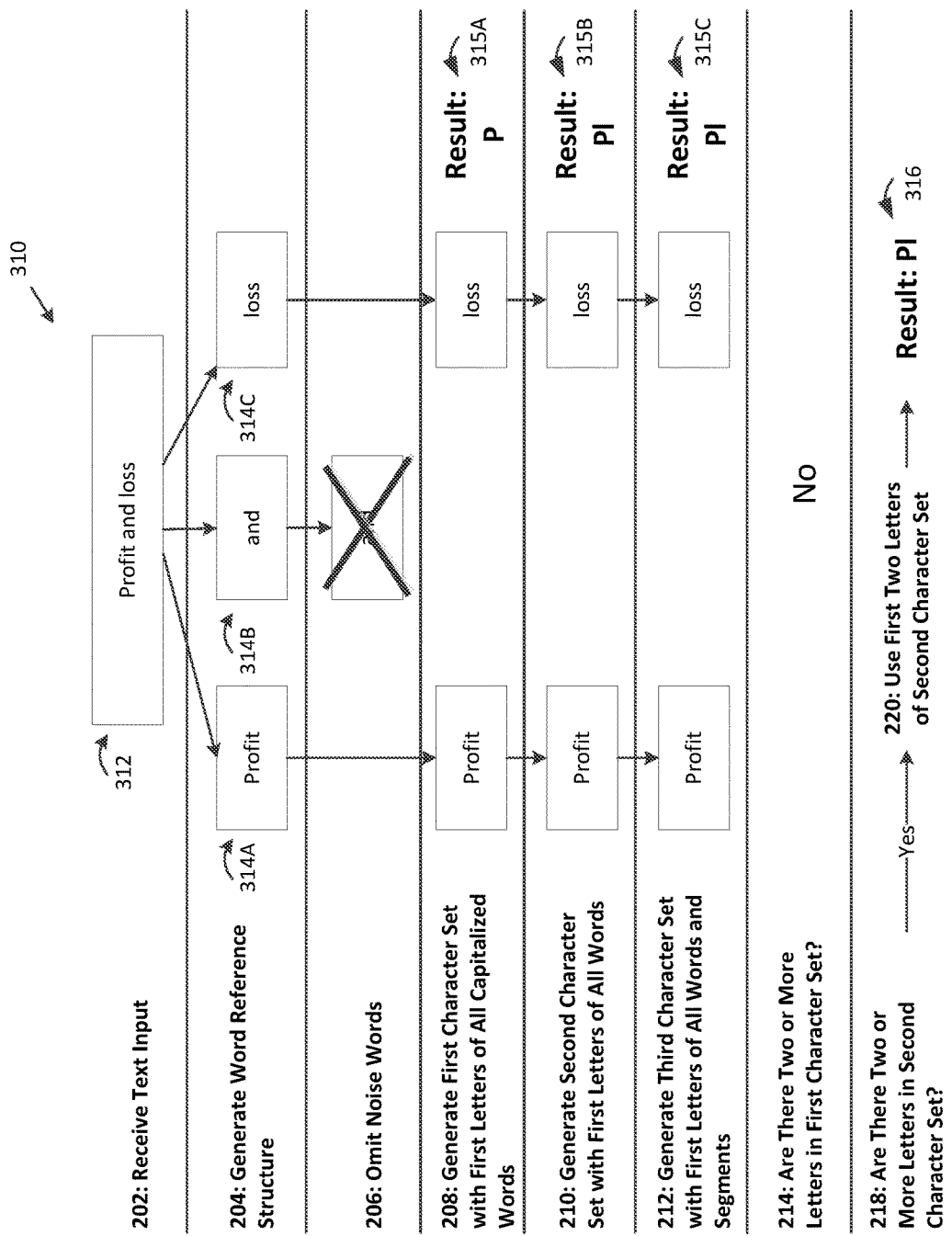

FIG. 3B shows an example of method 200 where the text input string is "Profit and loss" and the target acronym length is two. This example is similar to that shown in FIG. 3B except that the word "loss" is not capitalized. Beginning at the top, "Profit and loss" 312 is received as text input by operation 202. A word reference structure is generated by operation 204, comprising "Profit" token 314A, "and" token 314B, and "loss" token 314C. At operation 206, "and" token 314B is omitted from the word reference structure because it is determined to comprise a noise word.

Operation 208 generates a first character set using the first letters of all capitalized words, which is "Profit" token 314A. The resulting first character set is "P" 315A. Operation 210 generates a second character set using the first letters of all words (e.g., those that are capitalized and uncapitalized). As a result of evaluating "Profit" token 314A and "loss" token 314C, the resulting second character set is "Pl" 315B. Operation 212 then generates a third character set using the first letters of all words and segments (e.g., tokens with words of either case, compound words, hyphenated words, and word segments). As such, the third character set is generated using "Profit" token 314A and "loss" token 314C, resulting in a character set of "Pl" 315C.

Decision operation 214 evaluates whether there are two or more letters in the first character set. There are not, so decision operation 218 evaluates whether there are two or more letters in the second character set. There are, so at operation 220 the first two letters of the second character set are used, resulting in a generated acronym output of "Pl" 316.

Figure 3C:
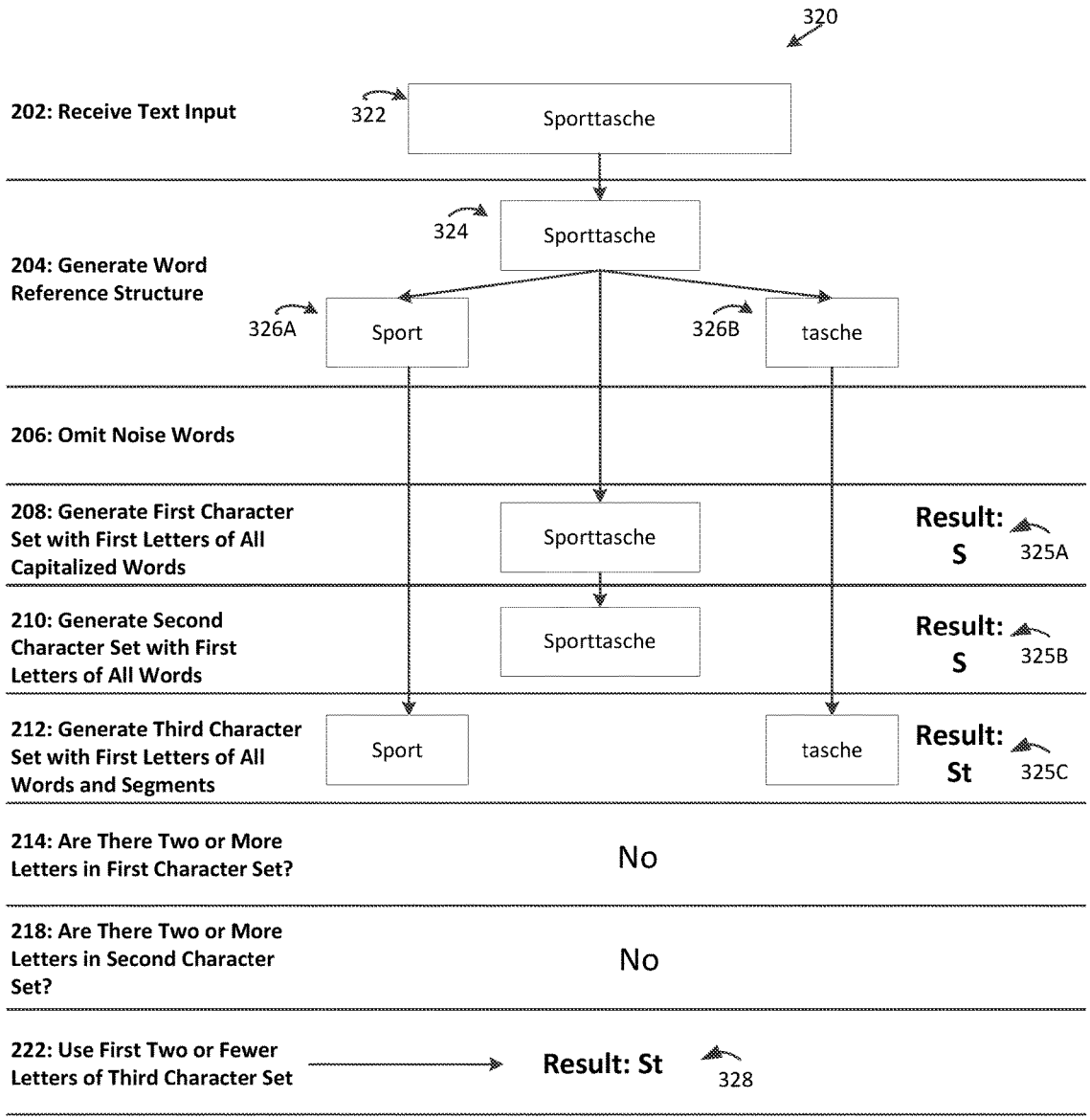

FIG. 3C shows another example of method 200 where the text input string is "Sporttasche," the target acronym length is two, and the language identifier is German. Beginning at the top, "Sporttasche" 322 is received as text input by operation 202. A word reference structure is generated by operation 204, comprising "Sporttasche" token 324, "Sport" token 326A, and "tasche" token 326B. In this example, the "Sporttasche" token 324 is a compound word which has been further subdivided into two segments, "Sport" token 326A and "tasche" token 326B. At operation 206, no tokens are omitted because there are no noise words present in the text input.

Operation 208 generates a first character set using the first letters of all capitalized words, which is "Sporttasche" token 324. The resulting first character set is "S" 325A. Operation 210 generates a second character set using the first letters of all words (e.g., those that are capitalized and uncapitalized). As a result of evaluating "Sporttasche" token 324, the resulting second character set is "S" 325B. Operation 212 then generates a third character set using the first letters of all words and segments (e.g., tokens with words of either case, compound words, hyphenated words, and word segments). As such, the third character set is generated using "Sport" token 326A and "tasche" token 326B, resulting in a character set of "St" 328.

Decision operation 214 evaluates whether there are two or more letters in the first character set. There are not, so decision operation 218 evaluates whether there are two or more letters in the second character set. There are not, so flow terminates at operation 222, which uses the first two or fewer letters present in the third character set. The generated acronym for "Sporttasche" is determined to be "St" 328.

Figure 3D:
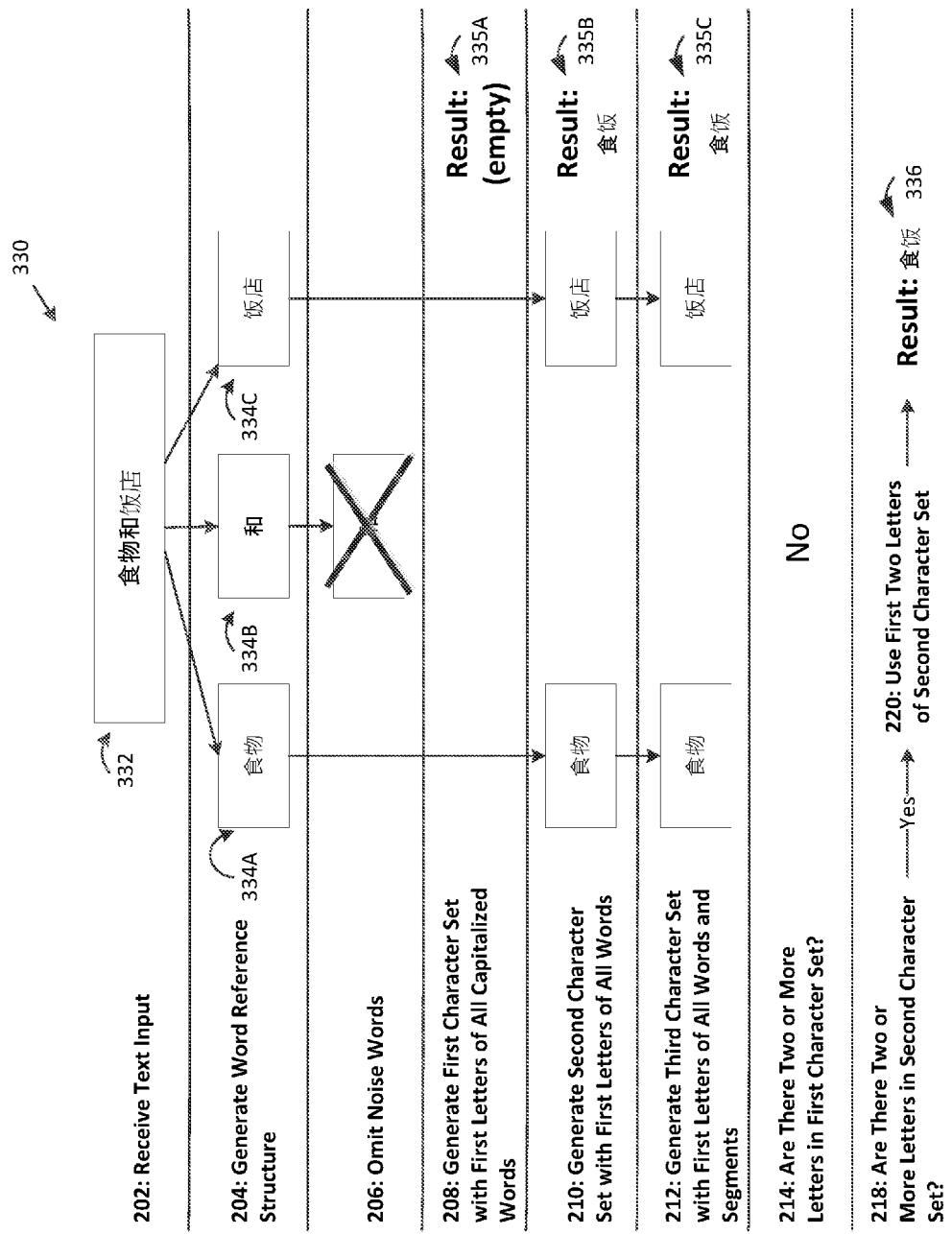

FIG. 3D shows another example of method 200 where the text input string is "食物和饭店," the target acronym length is two, and the language identifier is Chinese. Beginning at the top, "食物和饭店" 332 is received as text input by operation 202. A word reference structure is generated by operation 204, comprising "食物" token 334A, "和" token 334B, and "饭店" token 334C. At operation 206, "和" token 334B is omitted from the word reference structure because it is determined to comprise a noise word (in English, "和" means "and").

Operation 208 generates a first character set using the first letters of all capitalized word. Chinese does not have any capitalization mechanism, so the first character set is (empty) 335A. Operation 210 generates a second character set using the first letters of all words (e.g., those that are capitalized and uncapitalized). As a result of evaluating "食物" token 334A and "饭店" token 334C, the resulting second character set is "食饭" 335B. Operation 212 then generates a third character set using the first letters of all words and segments (e.g., tokens with words of either case, compound words, hyphenated words, and word segments). As such, the third character set is generated evaluating "食物" token 334A and "饭店" token 334C, resulting in a character set of "食饭" 335C.

Decision operation 214 evaluates whether there are two or more letters in the first character set. There are not, so decision operation 218 evaluates whether there are two or more letters in the second character set. There are, so flow terminates at operation 220 where the first two letters of the second character set are used, resulting in a generated acronym output of "食饭" 336.

Figure 5:
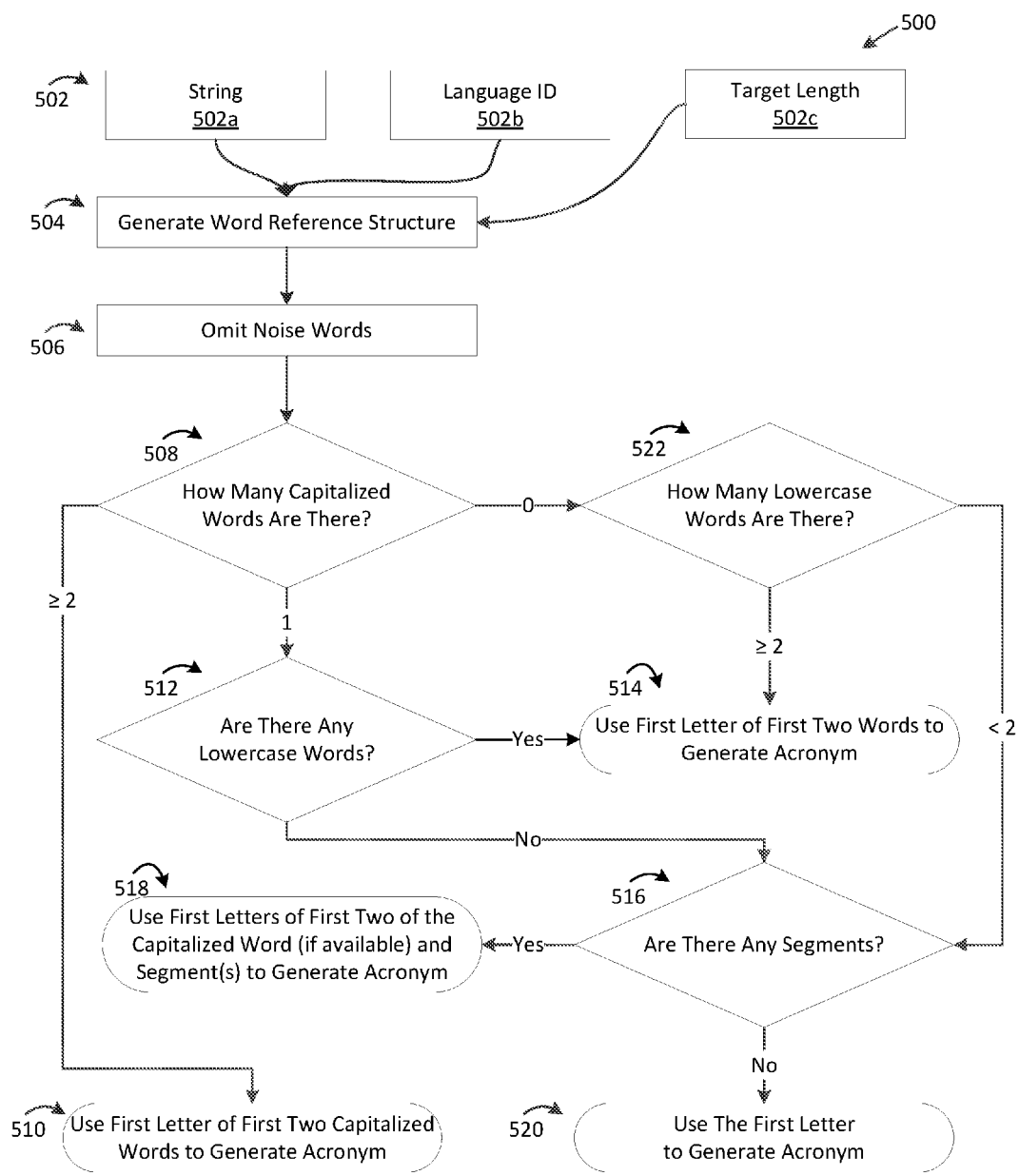
FIG. 5 illustrates an exemplary method for generating an acronym based on a string in accordance with another embodiment of the present invention.

FIG. 5 illustrates an alternative embodiment of a method 500 for generating an acronym based on a string, such as text input. Method 500 may be performed by a device, e.g., computing device 700 (FIG. 7) which may be a client computing device or a server.

Flow begins at operation 502, where the acronym generator receives input 502 as was described with reference to operation 202 in FIG. 2. Here, operation 502 receives three types of input: a string (e.g. text) 502a, a language ID 502b, and a target length 502c. Flow then moves to operation 504 where a word reference structure is generated as was described with reference to operation 204 in FIG. 2. At operation 506, noise words may be omitted from the word reference structure as was described with reference to operation 206 in FIG. 2 and method 500 in FIG. 5.

At decision operation 508, a determination is made regarding the number of capitalized words in the word reference structure. If it is determined that there are two or more capitalized words ("≥2" at 508) (assuming the target limit is 2 characters), flow branches to operation 510 where the first letter of the first two capitalized words may be used to generate the acronym. Flow then terminates.

If, however, it is determined that there is only one capitalized word ("1" at 508), flow branches to decision operation 512, where the availability of lowercase words is evaluated. If it is determined that there are lowercase words available ("YES" at 512), flow branches to operation 514, where an acronym may be generated using the first letter of the first two available capitalized and uncapitalized words. Flow then terminates.

Returning to decision operation 512, if it is determined that there are no lowercase words available ("NO" at 512), flow branches to decision operation 516 where the availability of segments is evaluated. If it is determined that there are segments available ("YES" at 516), flow branches to operation 518 where a word, if available, may be used in conjunction with one or more available segments to generate the acronym. Flow then terminates.

If decision operation 516 determines that there are no segments available ("NO" at 516), flow branches to operation 520 where the first letter of the available word may be used to generate a single character acronym. Flow then terminates.

Returning to decision operation 508, if it is determined that there are no capitalized words ("0" at 508), flow branches to decision operation 522, where the number of lowercase words may be evaluated. If it is determined that there are two or more lowercase words ("≥2" at 522), flow branches to operation 514, where an acronym may be generated using the first letter of the first of two available uncapitalized words. Flow then terminates.

On the other hand, if it is determined that there are less than two lowercase words ("<2" at 522), flow branches to decision operation 516 where the availability of segments is evaluated. If it is determined that there are segments available ("YES" at 516), flow branches to operation 518 where the first letters of a capitalized word, if available, one or more available segments are used to generate the acronym. Flow then terminates.

If, however, decision operation 516 determines that there are no segments available ("NO" at 516), flow branches to operation 520 where the first letter of the available word may be used to generate the acronym. Flow then terminates.

Further non-limiting examples of methods for generating acronyms for use in UI graphic elements are included below. In Examples 1 and 2 below, both text inputs have the same characters, but the "p" is lowercase in Example 1 and uppercase in Example 2. The acronym generation system may understand that Example 2 contains a compound word with two tokens "Share" and "Point" much like it did with the German word "Sporttasche" in FIG. 3C. However, as shown in Example 3, in one embodiment the system will give preference to capitalized words before word segments. If the target length is 2 characters, the system will output an acronym "MS" for Example 3.

| Example 1 | Example 2 | Example 3 |
| --- | --- | --- |
| String: Sharepoint | String: SharePoint | String: Microsoft SharePoint |
| Lcid: English | Lcid: English | Lcid: English |
| DesiredLength: 2 | DesiredLength: 2 | DesiredLength: 2 |
| First character set: S | First character set: S | First character set: MS |
| Second character set: S | Second character set: S | Second character set: MS |
| Third character set: S | Third character set: SP | Third character set: MSP |
| Acronym: S | Acronym: SP | Acronym: MS |

Examples 4-6 show an embodiment where the system considers "Microsoft" to be a noise word because it is used in all three of the text strings. As such, the Microsoft token is omitted from this method. If the system had not omitted the Microsoft token, both Examples 5 and 6 would have resulted in the same acronym: MS.

| Example 4 | Example 5 | Example 6 |
| --- | --- | --- |
| String: Microsoft SharePoint | String: Microsoft System Center | String: Microsoft Silverlight |
| Lcid: English | Lcid: English | Lcid: English |
| DesiredLength: 2 | DesiredLength: 2 | DesiredLength: 2 |
| First character set: MS | First character set: SC | First character set: S |
| Second character set: MS | Second character set: SC | Second character set: S |
| Third character set: MS | Third character set: SC | Third character set: S |
| Acronym: SP | Acronym: SC | Acronym: S |

Examples 7 shows an embodiment where common noise words are not omitted if they are capitalized and Example 8 shown an embodiment where common noise words are omitted even if they are capitalized:

| Example 7 | Example 8 |
| --- | --- |
| String: Profit And Loss | String: Profit And Loss |
| Lcid: English | Lcid: English |
| DesiredLength: 2 | DesiredLength: 2 |
| First character set: PAL | First character set: PL |
| Second character set: PAL | Second character set: PL |
| Third character set: PAL | Third character set: PL |
| Acronym: PA | Acronym: PL |

Examples 9-11 show an embodiment where the system evaluates input containing numbers. Examples 9 and 11 retain "2016" because it is determined to be a date and is therefore a relevant number within the input string. By contrast Example 10 omits the "2" because, based on the context, it determined to be a noise word. Example 11 generates a three-character acronym because the DesiredLength is set to 3 characters. As a result, the generated acronym is "J2f."

| Example 9 | Example 10 | Example 11 |
|---|---|---|
| String: FY 2016 401k | String: Old files 2 | String: January 2016 files |
| Lcid: English | Lcid: English | Lcid: English |
| DesiredLength: 2 | DesiredLength: 2 | DesiredLength: 3 |
| First character set: F | First character set: O | First character set: J |
| Second character set: F24 | Second character set: Of | Second character set: J2f |
| Third character set: F24 | Third character set: Of | Third character set: J2f |
| Acronym: F2 | Acronym: Of | Acronym: J2f |

Example 12 shows an example using a Chinese input with a target length of 1 character. Example 13 shows an input in Hebrew, where the system recognizes that the language is read from right to left.

| Example 12 | Example 13 |
|---|---|
| String:摩托车 | String:אבטיח |
| Lcid: Chinese | Lcid: Hebrew |
| DesiredLength: 1 | DesiredLength: 2 |
| First character set: (empty) | First character set: (empty) |
| Second character set:摩 | Second character set:א |
| Third character set:摩 | Third character set:א |
| Acronym:摩 | Acronym:א |

Figure 6:
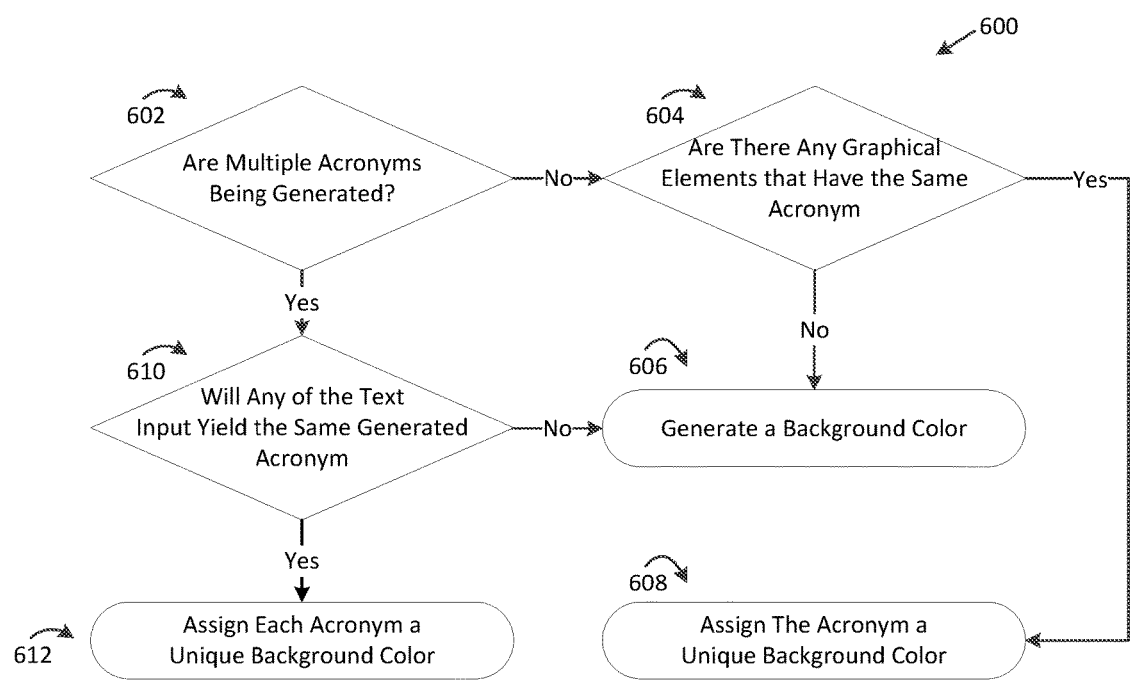
FIG. 6 illustrates an exemplary method for further distinguishing among UI graphic elements that are automatically generated in accordance with embodiments of the present invention

FIG. 6 illustrates an exemplary method for further distinguishing among UI graphic elements that are automatically generated in accordance with embodiments of the present invention. Flow begins at decision operation 602, where a determination is made regarding whether multiple acronyms are being generated at a single time. If only one acronym is being generated ("NO" at 602), flow branches to decision operation 604, where a determination is made whether there are any graphical elements that would match the generated acronym. In other words, the acronym generation application may review all of the graphic elements and their associated acronyms to determine whether there are any duplicate acronyms. If it is determined that there are not any duplicates ("NO" at 604), flow branches to operation 606 where a background color may be generated for the acronym. The background color may be randomly, but consistently, generated so that the same item gets the same color the next time it is rendered or may be generated based on a variety of factors including, but not limited to, the text input, a hash of the text input, the generated acronym, or a hash of the generated acronym. Flow terminates after operation 606.

If there is the acronym that is being generated is duplicative of an existing acronym ("YES" at 604), flow branches to operation 608 where a unique background color is assigned for the current acronym to allow it to be more easily distinguishable by a user. In one example, the background color may be randomly generated, or may be based upon the factors discussed above, where the factors are iteratively tweaked so as to yield a previously unused background color. Flow terminates after operation 608.

Returning to decision operation 602, if multiple acronyms being generated at the same time ("YES" at 602), flow branches to decision operation 610. At decision operation 610, a determination is made whether any of the text inputs would yield a similar generated acronym. If there are not ("NO" at 610), flow branches to operation 606 where a background color may be generated for each acronym as discussed above with respect to operation 606.

If, however, if there will be duplication between one or more acronyms of the current algorithms ("YES" at 610), flow branches to operation 612, where each acronym is assigned a unique background color. In one example, the background color may be randomly generated, or may be based upon the factors discussed above, where the factors are iteratively tweaked so as to yield a previously unused background color. Flow terminates after operation 612.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
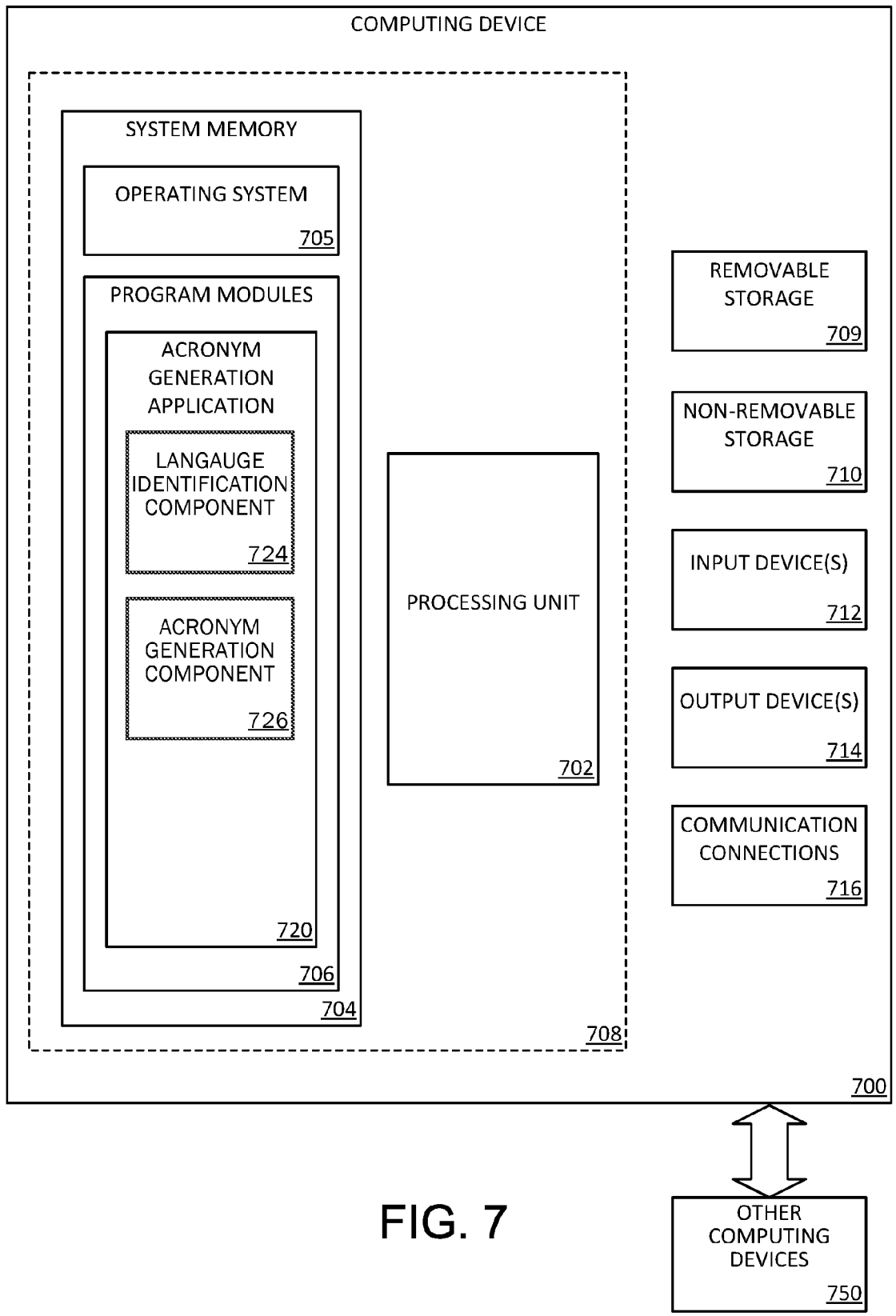
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above, including the client computing devices 102A-C and the server computing devices 106A-C. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for performing the various aspects disclosed herein such as a language identification component 724 and acronym generation component 726.

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
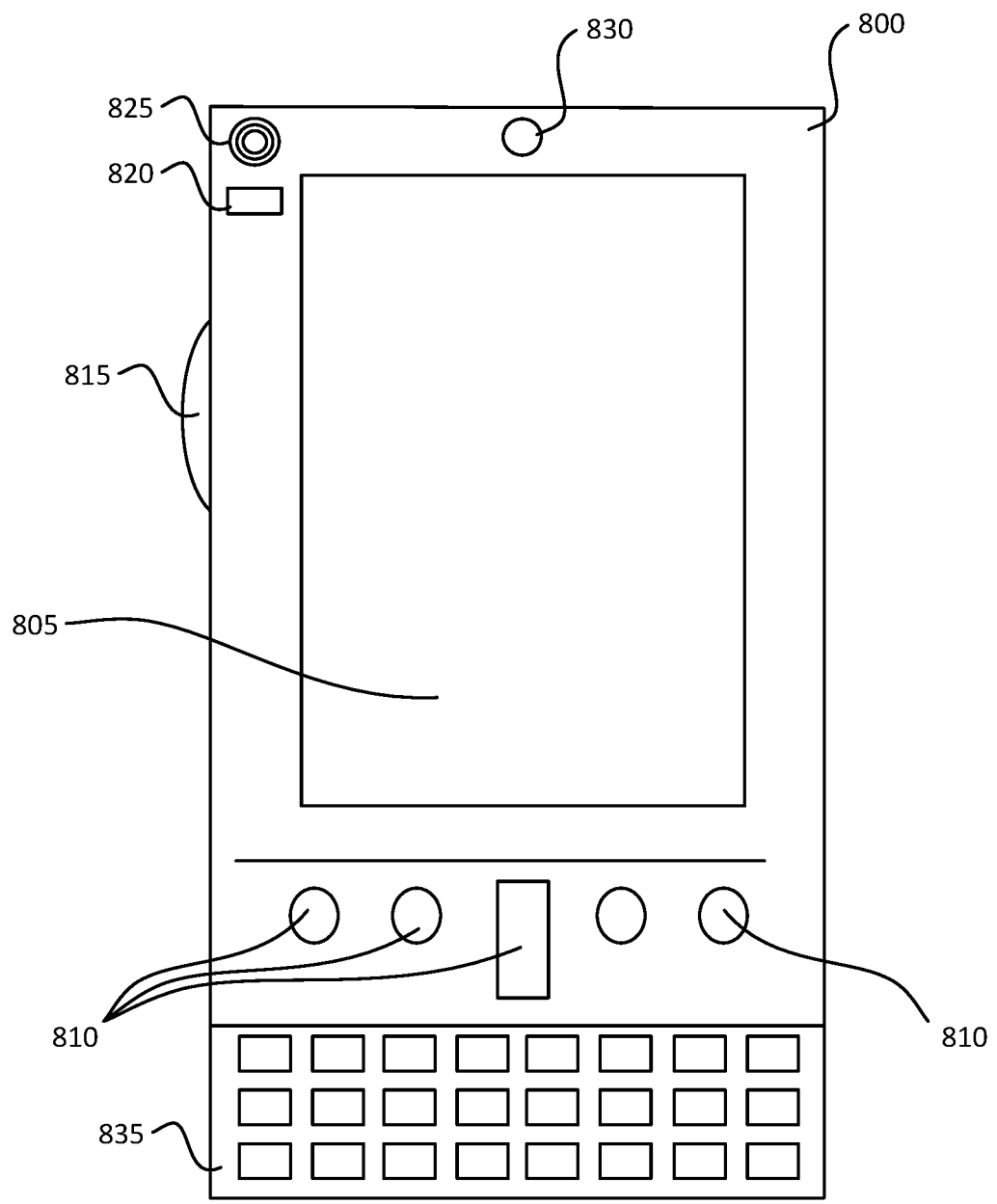
FIGS. 8A and 8B are simplified block diagrams of a mobile computing device with which aspects of the present disclosure may be practiced.
Figure 8B:
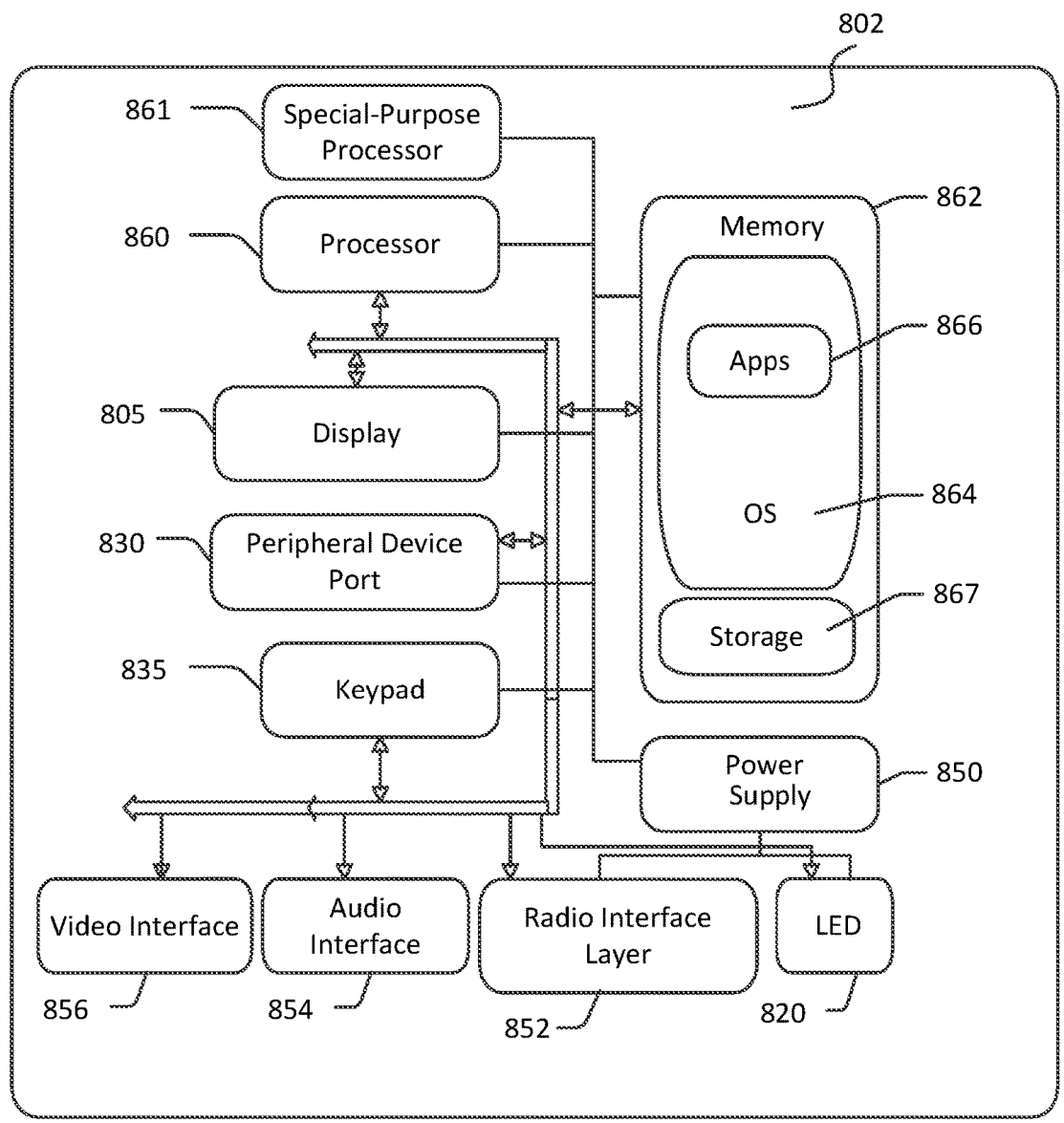

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
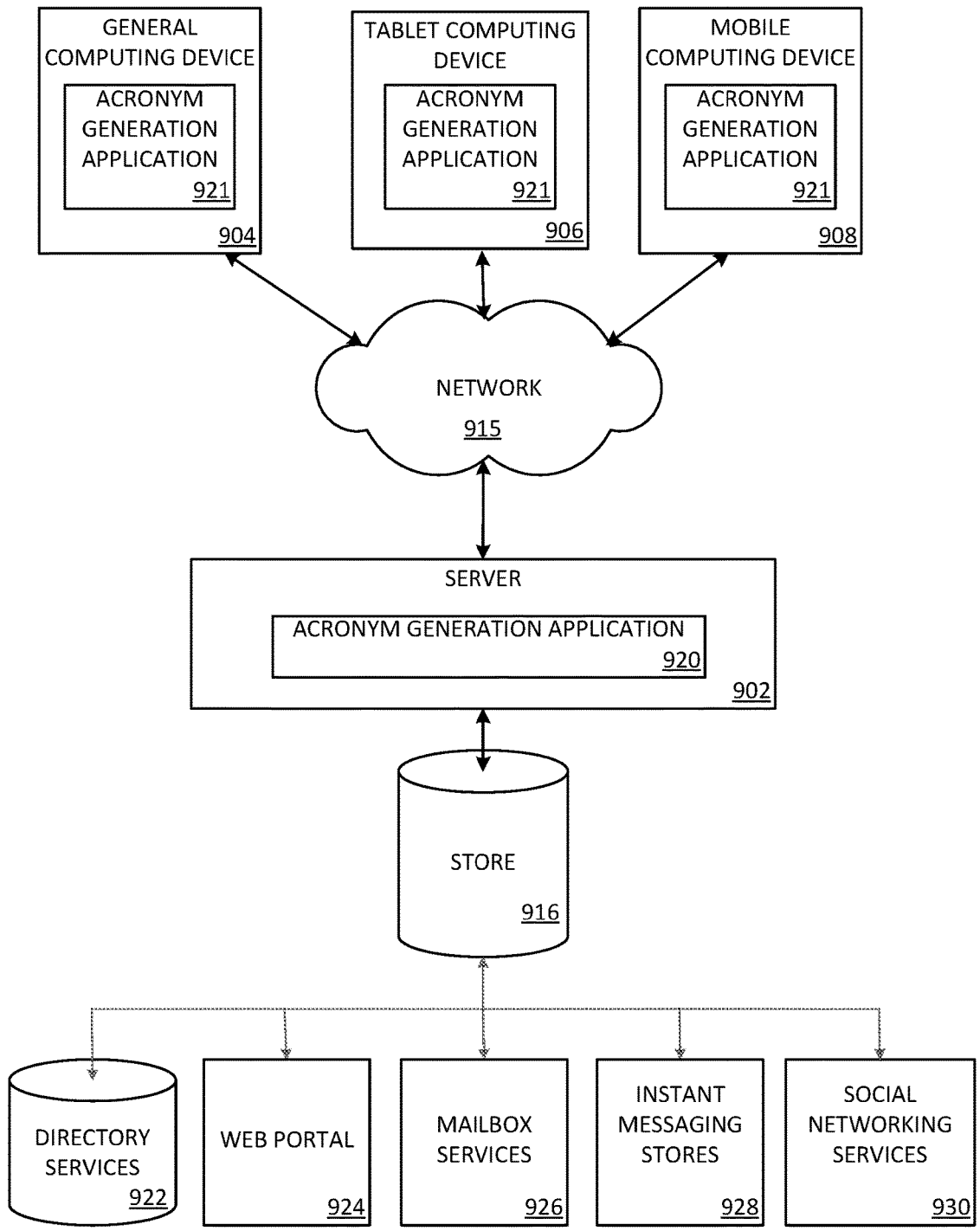
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. Acronym generation application 921 may be employed by a client that communicates with server device 902, and/or application generation component 920 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
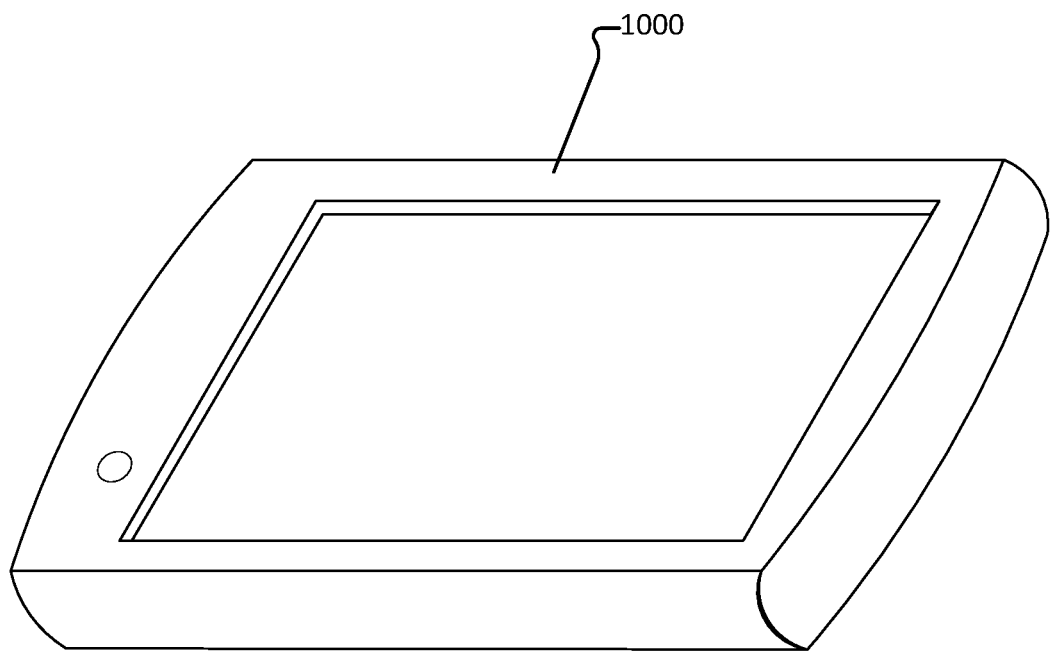
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

We claim:

1. A system for generating an acronym for display in a user interface on a computing device, the system comprising:
  a processor; and
  memory storing computer-readable instructions that when executed by the processor cause the system to:
    receive a text input associated with an item of the user interface;
    generate a graphical element associated with the item for display in the graphical user interface that comprises the acronym that is generated based on the text input by:
      generating a word reference structure from the text input, wherein the word reference structure comprises one or more of a capitalized token, a word token, and a compound segment token;
      generating a first character set when the word reference structure comprises one or more capitalized tokens;
      generating the acronym based on the first character set when a count of characters in the first character set is at least equal to a target length;
      generating a second character set when the count of characters in the first character set is less than the target length;
      generating the acronym based on the second character set when a count of characters in the second character set is at least equal to the target length;
      generating a third character set when the word reference structure includes a segment token; and
      generating the acronym based on the third character set when the count of characters in the second character set is less than the target length; and
    provide the graphical element comprising the acronym for display in the user interface on the computing device, wherein the graphical element is selectable by a user.

2. The system of claim 1, wherein the target length of the acronym is two characters.

3. The system of claim 1, wherein the word reference structure is a token tree.

4. The system of claim 1, further comprising computer-readable instructions that when executed by the processor cause the system to:
  receive a language identifier for the text input; and
  generate the word reference structure based on the language identifier and the text input.

5. The system of claim 4, further comprising computer-readable instructions that when executed by the processor cause the system to:
  identify boundaries in the text input based on the language identifier; and
  create one or more tokens based on the boundaries.

6. The system of claim 4, wherein the target length of the acronym is based on the language identifier.

7. The system of claim 4, further comprising computer-readable instructions that when executed by the processor cause the system to:
  automatically determine the language identifier based on the text input.

8. The system of claim 4, wherein a language associated with the language identifier is English.

9. The system of claim 1, further comprising computer-readable instructions that when executed by the processor cause the system to:
  omit a token from the word reference structure that contains a noise word.

10. A computer-implemented method for creating a graphical element for an item on a user interface of a computing device based on a string associated with the item, the method comprising:
  generating a reference structure for the string, wherein the reference structure comprises a plurality of tokens;
  determining a count of capitalized tokens in the reference structure;
  when it is determined that the count of capitalized tokens is at least equal to a maximum count, generating an acronym for the icon based on the capitalized tokens;
  when it is determined that the count of capitalized tokens is less than the maximum count, determining a count of word tokens in the reference structure;
  when it is determined that the count of word tokens is at least equal to the maximum count, generating the acronym for the icon based on the word tokens;
  when it is determined that the sum of the count of word tokens is less than the maximum count, generating the acronym for the icon based on the plurality of tokens;
  generating the graphical element comprising a generated acronym, wherein the generated acronym is one of a group comprising: the acronym for the icon based on the capitalized tokens, the acronym for the icon based on the word tokens, and the acronym for the icon based on the plurality of tokens; and
  providing the graphical element comprising the generated acronym for display in the user interface of the computing device, wherein the graphical element is selectable by a user.

11. The computer-implemented method of claim 10 wherein the maximum count is two.

12. The computer-implemented method of claim 10 wherein the graphical element is an icon.

13. The computer-implemented method of claim 10 further comprising:
  generating a background color for the graphical element based on the string.

14. The computer-implemented method of claim 10 further comprising:
  determining that the user interface has a second graphical element with an acronym that is the same as the generated acronym; and
  generating a background color for the graphical element that is different than a background color of the second graphical element.

15. The computer-implemented method of claim 10 wherein the plurality of tokens comprises at least one segment token.

16. The computer-implemented method of claim 10, wherein generating the acronym based on the plurality of tokens further comprises:
  building the acronym with a first character of each of the plurality of tokens.

17. The computer-implemented method of claim 10, wherein the reference structure is a token list.

18. The computer-implemented method of claim 10, wherein the string is text.

19. A system for generating an acronym from a text string for display in a user interface on a computing device, the system comprising:
- a processor; and
- a memory storing computer-readable instructions that when executed by the processor cause the system to:
  - receive inputs associated with an item of the user interface comprising the text string, a language identifier for the text string, and a target length for the acronym;
  - omit noise words from the text string;
  - generate a graphical element associated with the item for display in the graphical user interface that comprises the acronym that is generated from the text string by:
    - generating a word reference structure based on the inputs, wherein the word reference structure comprises one or more capitalized tokens and one or more word tokens;
    - generating a first character set based on the one or more capitalized tokens, wherein the first character set includes a first character of each of the one or more capitalized tokens;
    - generating a second character set based on the one or more word tokens, wherein the second character set includes a first character of each of the one or more word tokens;
    - generating the acronym based on the first character set when a count of the one or more capitalized tokens is at least equal to the target length for the acronym; and
    - generating the acronym based on the second character set when:
      - the count of the one or more capitalized tokens is less than the target length for the acronym; and
      - a count of the one or more word tokens is at least equal to the target length for the acronym; and
  - provide the graphical element comprising the acronym for display in the user interface on the computing device, thereby enabling a user to interact with the graphical element.

20. The system of claim 19, wherein the word reference structure further comprises one or more segment tokens and the acronym is generated based on the text input by further:
- generating a third character set based on the one or more word tokens and the one or more segment tokens, wherein the third character set includes a first character of each of the one or more word tokens and the first character of each of the one or more segment tokens; and
- generating the acronym based on the third character set when the count of the one or more word tokens is less than the target length for the acronym.

* * * * *